(12) United States Patent
Lam et al.

(10) Patent No.: US 11,663,193 B2
(45) Date of Patent: May 30, 2023

(54) IDENTIFYING INCORRECT LINKS

(71) Applicant: International Business Machines Corporation, Armonk, NY (US)

(72) Inventors: Joseph Lam, Markham (CA); Laura Vang, New York, NY (US); Natalie Byron, Lyndhurst, OH (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 17/125,139

(22) Filed: Dec. 17, 2020

(65) Prior Publication Data

US 2022/0197889 A1    Jun. 23, 2022

(51) Int. Cl.
| | |
|---|---|
| G06F 7/00 | (2006.01) |
| G06F 16/23 | (2019.01) |
| G06F 16/955 | (2019.01) |
| G06F 40/143 | (2020.01) |
| G06F 40/40 | (2020.01) |
| H04L 67/02 | (2022.01) |

(52) U.S. Cl.
CPC ...... *G06F 16/2365* (2019.01); *G06F 16/9558* (2019.01); *G06F 16/9566* (2019.01); *G06F 40/143* (2020.01); *G06F 40/40* (2020.01); *H04L 67/02* (2013.01)

(58) Field of Classification Search
CPC ........ G06F 16/20; G06F 16/94; G06F 16/957; G06F 16/958; G06F 16/2365; G06F 16/9558; G06F 16/9566; G06F 16/313; G06F 16/955; G06F 40/40; G06F 40/143; G06F 40/134; G06F 40/20; G06F 40/279; H04L 67/02
See application file for complete search history.

(56) References Cited

U.S. PATENT DOCUMENTS

| | | | |
|---|---|---|---|
| 6,952,723 B1 * | 10/2005 | Laiho | G06F 16/9566 707/E17.115 |
| 8,201,081 B2 | 6/2012 | Stroe et al. | |
| 8,706,909 B1 | 4/2014 | Nickson | |

(Continued)

FOREIGN PATENT DOCUMENTS

CN    108052619 A    5/2018

OTHER PUBLICATIONS

Mesibov, B., "Checking a website for incorrect links", Jun. 25, 2012, 5 pages.

(Continued)

*Primary Examiner* — Mohammad A Sana
(74) *Attorney, Agent, or Firm* — Eric W. Chesley

(57) ABSTRACT

A method can include obtaining target data corresponding to a link. The method can include determining, based on the target data, that the link is valid. The method can include obtaining, in response to the determining that the link is valid, source data corresponding to the link. The method can include determining, by comparing the target data to the source data, a degree of relevance between the target data and the source data. The method can include determining, based on the degree of relevance, that the link is incorrect.

(Continued)

The method can include generating, in response to the determining that the link is incorrect, a corresponding notification. The method can include initiating a transfer of the notification to a user device.

20 Claims, 5 Drawing Sheets

(56) References Cited

U.S. PATENT DOCUMENTS

| | | | |
|---|---|---|---|
| 9,760,632 B2 | 9/2017 | Brundage et al. | |
| 10,083,244 B2 | 9/2018 | Williams et al. | |
| 10,430,474 B2 | 10/2019 | Denninghoff | |
| 2003/0158953 A1 | 8/2003 | Lal | |
| 2007/0130151 A1 | 6/2007 | Wiles | |
| 2009/0300768 A1 | 12/2009 | Krishnamurthy et al. | |
| 2009/0313563 A1* | 12/2009 | Faivre | G06Q 30/06 715/764 |
| 2016/0154893 A1* | 6/2016 | Ochiai | G06F 40/134 707/702 |
| 2020/0089803 A1* | 3/2020 | Denholm | G06F 16/313 |

OTHER PUBLICATIONS

Choi et al., "Detecting Malicious Web Links and Identifying Their Attack Types", WebApps '11:2nd USENIX Conference on Web Application Development, pp. 125-136.

Volz et al., "Discovering and Maintaining Links on the Web of Data", ISWC 2009, 16 pages.

Isele et al., "Silk—The Linked Data Integration Framework", Eccenca command your data!, University of Mannheim, printed Aug. 26, 2020, 3 pages.

Gowtham et al., "An efficacious method for detecting phishing webpages through target domain identification", Decision Support Systems, Nov. 30, 2013, 28 pages.

Dai et al., "Bridging Link and Query Intent to Enhance Web Search", In Proceedings of the 22nd ACM conference on Hypertext and hypermedia, Jun. 6-9, 2011, pp. 17-26.

Unknown, "Latest news from xyz", printed Aug. 26, 2020, 4 pages.

Mell et al., "The NIST Definition of Cloud Computing", Recommendations of the National Institute of Standards and Technology, Sep. 2011, 7 pages.

* cited by examiner

IDENTIFYING INCORRECT LINKS

BACKGROUND

The present disclosure relates to website navigation, and more specifically, to website navigation using links.

Websites can include links that point to resources, such as web pages, that can be stored on a web server. Various status codes can indicate when such resources cannot be accessed through a link.

SUMMARY

According to embodiments of the present disclosure, a method can include obtaining target data corresponding to a link. The method can include determining, based on the target data, that the link is valid. The method can include obtaining, in response to the determining that the link is valid, source data corresponding to the link. The method can include determining, by comparing the target data to the source data, a degree of relevance between the target data and the source data. The method can include determining, based on the degree of relevance, that the link is incorrect. The method can include generating, in response to the determining that the link is incorrect, a corresponding notification. The method can include initiating a transfer of the notification to a user device.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
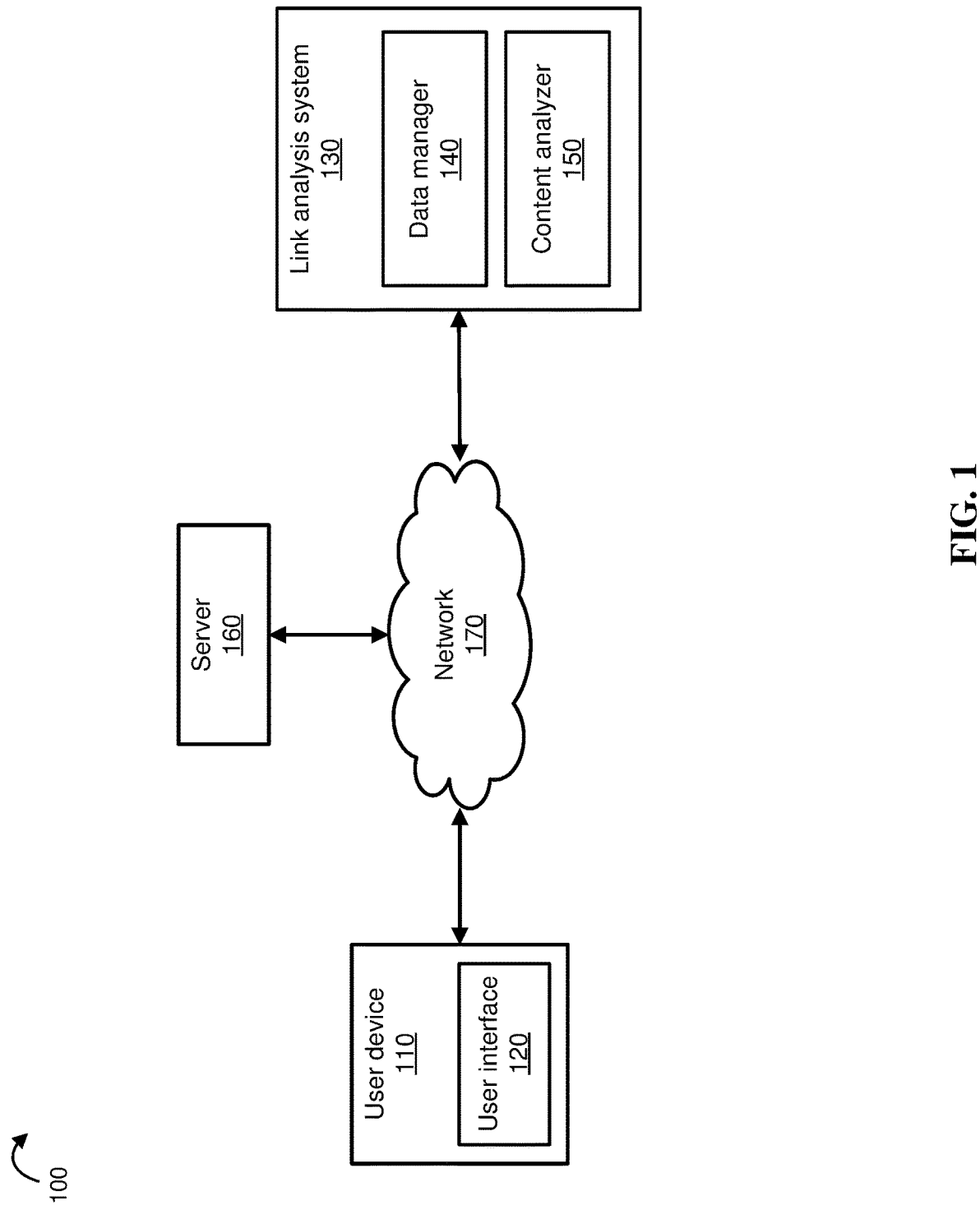
FIG. 1 depicts an example computing environment having a link analysis system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to website navigation; more particular aspects relate to identifying incorrect links. While the present disclosure is not necessarily limited to such applications, various aspects of the disclosure may be appreciated through a discussion of various examples using this context.

Websites can include links that point to resources, such as web pages and/or other files, that can be stored on a web server. In some instances, a link can be invalid because it points to a resource that cannot be found in a storage location. For example, if a web page is moved or deleted from a web server, selecting a link that points to the web page can result in the web server transmitting a 404 status code to a client program, such as a web browser. In this example, the 404 status code can indicate that the resource (i.e., the web page) cannot be found on the web server. In some instances, a link can be valid (e.g., the link can point to a resource that can be found in a storage location); however, the link can be incorrect because it points to the wrong resource. For example, a link on a company web page can be described on the web page as providing an organizational chart for a particular department. However, the link can actually point to a document that includes a floorplan of the company's office building.

To address these and other challenges, embodiments of the present disclosure include a link analysis system. In some embodiments, the link analysis system can identify a link that is invalid. In some embodiments, the link analysis system can employ natural language processing technology to identify a link that is both valid and incorrect. In some embodiments, in response to identifying a link that is valid and incorrect, the link analysis system can determine if a web page inventory includes a resource that should properly be associated with the link. For example, in the example discussed above, the link analysis system can determine if a web page inventory includes the organizational chart described on the company web page. In some embodiments, the link analysis system can obtain feedback from a user to improve the accuracy of its operations.

Accordingly, embodiments of the present disclosure can facilitate the maintenance of a website's accuracy and usability. Additionally, by applying natural language processing to analyze features of source data and target data, embodiments of the present disclosure can accurately identify incorrect links, as well as resources that should properly be associated with such incorrect links.

Turning to the figures, FIG. 1 illustrates a computing environment 100 that includes one or more of each of a link analysis system 130, a user device 110, a server 160, and/or a network 170. In some embodiments, at least one link analysis system 130, user device 110, and/or server 160 can exchange data with at least one other through the at least one network 170. One or more of each of the link analysis system 130, user device 110, server 160, and/or network 170 can include a computer system, such as the computer system 301 discussed with respect to FIG. 3.

In some embodiments, the link analysis system 130 can be included in software installed on a computer system of at least one of the user device 110 and/or server 160. For example, in some embodiments, the link analysis system 130 can be included as a plug-in software component of software installed on the user device 110. The link analysis system 130 can include program instructions implemented by a processor, such as a processor of the user device 110, to perform one or more operations discussed with respect to FIG. 2.

In some embodiments, the link analysis system 130 can include one or more modules, such as a data manager 140 and/or a content analyzer 150. In some embodiments, the data manager 140 and the content analyzer 150 can be integrated into a single module. In some embodiments, the data manager 140 can obtain and/or store data and initiate notifications. In some embodiments, the content analyzer 150 can analyze and/or interpret data. In some embodiments, the link analysis system 130 can include natural language processing software for analyzing and interpreting text. In some embodiments, the data manager 140 and/or the content analyzer 150 can include program instructions implemented by a processor, such as a processor of the user device 110, to perform one or more operations discussed with respect to FIG. 2. For example, in some embodiments, the data manager 140 can include program instructions to perform operations 205, 240, 245, and 250, FIG. 2. In some embodiments, the content analyzer 150 can include program instructions to perform operations 210-235, FIG. 2. In some embodiments, the link analysis system 130 can autonomously and/or intermittently perform operations discussed with respect to FIG. 2.

In some embodiments, the one or more user devices 110 can include a device such as a notebook computer, tablet, mobile phone, desktop computer, and the like. The user device 110 can include a user interface 120, such as a screen, touchscreen, microphone, speaker, and/or keyboard. In some embodiments, a user can view web pages and/or receive information from the link analysis system 130 through the user device 110. In some embodiments, a user can input feedback to the link analysis system 130 through the user interface 120 of the user device 110.

In some embodiments, the one or more servers 160 can include one or more web servers. In some embodiments, the one or more servers 160 can store data such as files, web pages, and/or a web page inventory (not shown).

In some embodiments, the network 170 can be a wide area network (WAN), a local area network (LAN), the internet, or an intranet. In some embodiments, the network 170 can be substantially similar to, or the same as, cloud computing environment 50 discussed with respect to FIG. 4.

Figure 2:
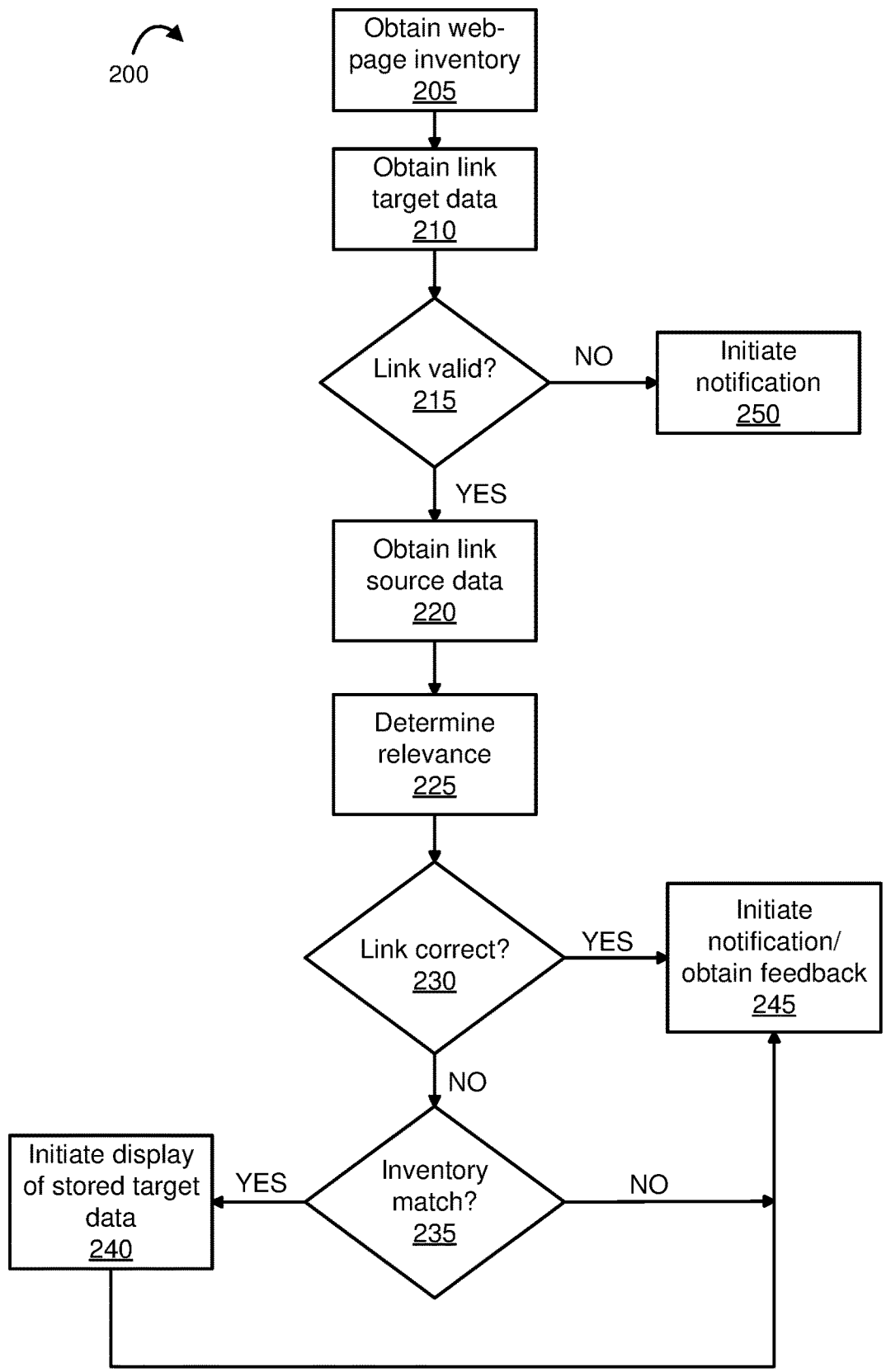
FIG. 2 depicts a flowchart of an example method for identifying incorrect links, in accordance with embodiments of the present disclosure.

FIG. 2 illustrates a flowchart of an example method 200 for identifying incorrect links, in accordance with embodiments of the present disclosure. The method 200 can be performed by a link analysis system, such as the link analysis system 130 discussed with respect to FIG. 1.

In operation 205, in some embodiments, the link analysis system can obtain a web page inventory. A web page inventory can include target data that corresponds to a set of web pages. Such target data can include information such as a link to a web page, a title of a web page, and/or content of a web page. For example, in some embodiments, operation 205 can include the link analysis system obtaining a web page inventory for a set of web pages of a site map (e.g., a hierarchical list of the web pages of a website). In this example, the web page inventory can include target data for each web page of the set of web pages. Such target data can include information such as a Uniform Resource Locator (URL) for each web page, a title of each web page, and/or text or documents presented on each web page. In some embodiments, operation 205 can include the link analysis system storing or initiating storage of the web page inventory on a computing device, such as server 160, discussed with respect to FIG. 1.

In operation 210, the link analysis system can obtain target data corresponding to a selected link. In some embodiments, the selected link can be selected by a user, such as a website manager. In some embodiments, the selected link can be selected by the link analysis system. For example, in some embodiments, the link analysis system can automatically select one or more links for analysis in accordance with method 200. In some embodiments, the target data obtained in operation 210 can include information such as the selected link (e.g., a URL and/or hypertext), a title of a web page pointed to by the selected link, and/or content (e.g., text and/or a text document) of a web page pointed to by the selected link. In some embodiments, target data can include content such as meta data. For example, in some embodiments, target data can include one or more meta tags that can include title, description, and/or keyword information for a web page pointed to by a selected link. In this disclosure, a web page pointed to by a selected link can be referred to as a target web page.

In operation 215, the link analysis system can determine whether a link is valid. In some embodiments, the link analysis system can determine whether the link is valid based on the target data obtained in operation 210. In some embodiments, a valid link can refer to a link (e.g., a URL or hypertext) that points to a resource that can be found in a storage location, such as on a server. For example, in some embodiments, a valid link for a restaurant's website can point to a collection of files that make up the restaurant's website; such files can be stored on a web server. In contrast, in some embodiments, an invalid link can refer to a link that points to a resource that cannot be found in a storage location. In some embodiments, a link can be invalid if selecting the link results in a web server returning a message indicating that a requested resource is not available. In some embodiments, such a message can include an error message and/or a status code, such as a 404 status code indicating that a resource is not found. In some embodiments, operation 215 can include the link analysis system identifying whether a web server returns such an error message and/or status code. In these embodiments, the link analysis system can analyze data (e.g., target data) returned from a web server in response to selecting a link. Such analyzing can include the link analysis system identifying terminology such as "404," "not found," "error," "resource gone," in the data returned from the web server, and determining that a link is invalid when such terminology is identified. If the link analysis system determines that a link is invalid, then the link analysis system can proceed to operation 250. Otherwise, if the link analysis system determines that a link is valid, then the link analysis system can proceed to operation 220.

In operation 250, in response to determining that a link is invalid, the link analysis system can initiate a notification indicating that the link is invalid. In some embodiments, operation 250 can include the link analysis system generating an alphanumeric text message, audible alert, and/or visual alert. In some embodiments, operation 250 can include the link analysis system issuing a command to a device, such as a user device (e.g., user device 110, FIG. 1), to generate, display, and/or issue such a text message and/or alert.

In operation 220, in response to determining that a link is valid, the link analysis system can obtain source data corresponding to the link. In some embodiments, the link analysis system can obtain such source data from a source such as a web page, email message, and/or document that includes a link. In some embodiments, the source data can include information such as a HyperText Markup Language (HTML) code label and text proximate the HTML code label. For example, in some embodiments, a source (e.g., a web page) can include the text, "Summer is the season of Apples! And what's better than munching on a delicious piece of Apple Pie? Get the Apple Pie Recipe!" In this example, "Get the Apple Pie Recipe!" can be displayed as a hyperlink on the web page. Further in this example, the HTML code corresponding to the hyperlink can be: <a href="http://www.coolrecipes.com/howtobuysteak.html">Get the Apple Pie Recipe!/a>. In this example, the link analysis system can be configured to identify "Get the Apple Pie Recipe!" as an HTML code label. Additionally in this example, the link analysis system can be configured to identify, "Summer is the season of Apples! And what's better than munching on a delicious piece of Apple Pie?" as text proximate the HTML code label.

In operation 225, the link analysis system can determine a degree of relevance between target data obtained in operation 210 and source data obtained in operation 220. In some embodiments, such a degree of relevance can indicate a likelihood that a link is correct. For example, in some embodiments, a degree of relevance can indicate a likelihood that a link for a restaurant website actually points to such a website, rather than to an article about financial investment. In some embodiments, to determine such a degree of relevance, operation 225 can include the link analysis system comparing target data and/or contextual data corresponding to the target data to source data and/or contextual data corresponding to the source data.

For example, in some embodiments, operation 225 can include the link analysis system employing natural language processing technology to identify one or more key words and/or contextual data (e.g., key concepts) included in target data and/or source data. In an example, continuing with the "Get the Apple Pie Recipe!" example discussed above, the link analysis system can apply natural language processing to the source data to identify key words, such as "pie" and "recipe." In this example, the link analysis system can further apply natural language processing to the source data to identify contextual data that can indicate characteristics such as intents, concepts, and/or themes associated with the source data. Accordingly, in this example, the link analysis system can identify contextual data, such as "apples," "get recipe for apple pie," and "make/eat apple pie." Continuing with this example, the link analysis system can similarly apply natural language processing to the target data. In this example, the HTML code includes "howtobuysteak.html," which is a web page having the title, "How to Buy the Perfect Steak," and including content directed to instructions for buying a perfect steak. Thus, regarding the target data, the link analysis system can identify key words, such as "buy" and "steak," as well as contextual data, such as "purchase perfect steak" and "purchase instructions." Continuing with this example, the link analysis system can determine a degree of relevance between the target data and the source data by comparing the key words and the contextual data corresponding to the target data to the keywords and the contextual data corresponding to the source data.

In some embodiments, determining such a degree of relevance can include the link analysis system generating a relevance value that corresponds to a quantity of key words/contextual data of the target data that matches a quantity of key words/contextual data of the source data. For example, in some embodiments, the link analysis system can increase a numerical relevance value for each key word and/or context of the target data that is identical and/or synonymous with a key word and/or context of the source data. Continuing with the example discussed above, the link analysis system can compare the key words and contextual data discussed above and determine that no matches are present. Accordingly, in this example, the link analysis system can determine that the source data and the target data have a low degree of relevance. Additionally, in some embodiments, in response to the comparing in this example, the link analysis system can refrain from increasing a numerical relevance value.

In operation 230, the link analysis system can determine, based on the degree of relevance determined in operation 225, whether a link is correct. In some embodiments, a link being correct can refer to the link pointing to a resource that is consistent with the source data corresponding to the link. For example, a link having source data that describes a map to a company can be correct if the link points to a document that includes a map to the company. In contrast, such a link can be incorrect if the link points to a document that includes the company's annual report. In some embodiments, operation 230 can include the link analysis system comparing a numerical relevance value generated in operation 225 to a predetermined threshold. Such a predetermined threshold can be selected to distinguish a link that is likely correct from a link that is likely incorrect. For example, in some embodiments, the link analysis system can determine that a link is correct in response to determining that the numerical relevance value exceeds the predetermined threshold. In contrast, in these embodiments, the link analysis system can determine that the link is incorrect in response to determining that the numerical relevance value does not exceed the predetermined threshold. In some embodiments, the predetermined threshold can be selected by an entity such as a programmer or user of the link analysis system, or by the link analysis system itself. In operation 230, if the link analysis system determines that a link is correct, then the link analysis system can proceed to operation 245. Otherwise, if the link analysis system determines that a link is incorrect, then the link analysis system can proceed to operation 235.

In operation 235, the link analysis system can determine whether a match is present between source data obtained in operation 220 and stored target data of a web page inventory obtained in operation 205. Accordingly, operation 235 can permit the link analysis system to search for a resource, such as a web page and/or a document, that may be consistent with the source data of a link that was determined to be incorrect in operation 230. In this way, the link analysis system can facilitate correcting an incorrect link.

For example, continuing with the example discussed above, operation 235 can include the link analysis system comparing key words, such as "pie" and "recipe" and contextual data, such as "apples," "get recipe for apple pie," and "make/eat apple pie" obtained from the source data to stored target data of a web page inventory. In this example, the stored target data can include key words, such as "desserts," "pie," "recipe," and "ingredients." Further in this example, the stored target data can include contextual data, such as "apple pie recipe." In this example, such stored target data can correspond to a recipe document included in the web page inventory. By comparing such key words and contextual data, the link analysis system can determine that the recipe document is consistent with the source data of the "Get the Apple Pie Recipe!" link. In response to the determining, the link analysis system can initiate a display of the recipe document and/or initiate a notification regarding the presence of a match.

To determine whether a match is present in operation 235, the link analysis system can perform operations substantially similar to those discussed with respect to operations 225 and 230. For example, operation 235 can include the link analysis system employing natural language processing technology to identify one or more keywords and/or contextual data included in the stored target data of the web page inventory.

Additionally, operation 235 can include the link analysis system determining a degree of relevance between the stored target data and source data obtained in operation 220. The link analysis system can determine such a degree of relevance by comparing the key words and the contextual data corresponding to the stored target data to the keywords and the contextual data corresponding to the source data obtained in operation 220. In some embodiments, determining the degree of relevance in operation 235 can include the link analysis system generating a relevance value that is analogous to that described with respect to operation 225. Additionally, in some embodiments, operation 235 can include the link analysis system comparing the relevance value to a predetermined threshold, analogous to that described with respect to operation 230, and determining that a match is present in response to determining that the relevance value exceeds the predetermined threshold. In operation 235, if the link analysis system determines that a match is present between source data obtained in operation 220 and stored target data of a web page inventory obtained in operation 205, then the link analysis system can proceed to operation 240. Otherwise, if the link analysis system determines that such a match is not present then the link analysis system can proceed to operation 245.

In operation 240, in response to the link analysis system determining in operation 235 that a match is present, the link analysis system can initiate a display of the matched stored target data (i.e., the stored target data matched in operation 235). For example, continuing with the example discussed above, the link analysis system can initiate a display of the recipe document. In some embodiments, initiating a display of the matched stored target data can include the link analysis system modifying a link, such that the link points to the matched stored target data. In some embodiments, initiating a display of the matched stored target data can include the link analysis system displaying or issuing a command for a user device to display the matched stored target data. For example, the link analysis system can generate a pop-up window that displays a URL matched in operation 235. In this way, the user can identify a resource that should properly be associated with a link identified as incorrect in operation 230.

In operation 245, the link analysis system can initiate one or more notifications. In some embodiments, the one or more notifications can include one or more alphanumeric text messages, audible alerts, and/or visual alerts to be displayed and/or emitted from a user device. For example, in some embodiments, in response to determining that a link is correct in operation 230, the link analysis system can generate a corresponding text message to indicate the correct link. In some embodiments, in response to determining in operation 235 that a match is not present, operation 245 can include the link analysis system modifying a site map to include a corresponding visual alert indicating an incorrect link that lacks a match in a web page inventory. In some embodiments, in response to determining in operation 235 that a match is present, operation 245 can include the link analysis system generating a corresponding text message to indicate that a match was found for an incorrect link.

In some embodiments, operation 245 can include the link analysis system obtaining feedback data from a user regarding aspects such as a determination of the link analysis system in operations 215, 230, and/or 235. In some embodiments, such feedback can include input from a user regarding an accuracy of keywords and/or contextual data identified in operation 225. For example, in some embodiments, a user can indicate whether the keywords and/or contextual data identified by the link analysis system in operation 225 are consistent with the user's interpretation/understanding of the target data and/or source data. In this way, the link analysis system can employ reinforcement learning to improve its accuracy.

Figure 3:
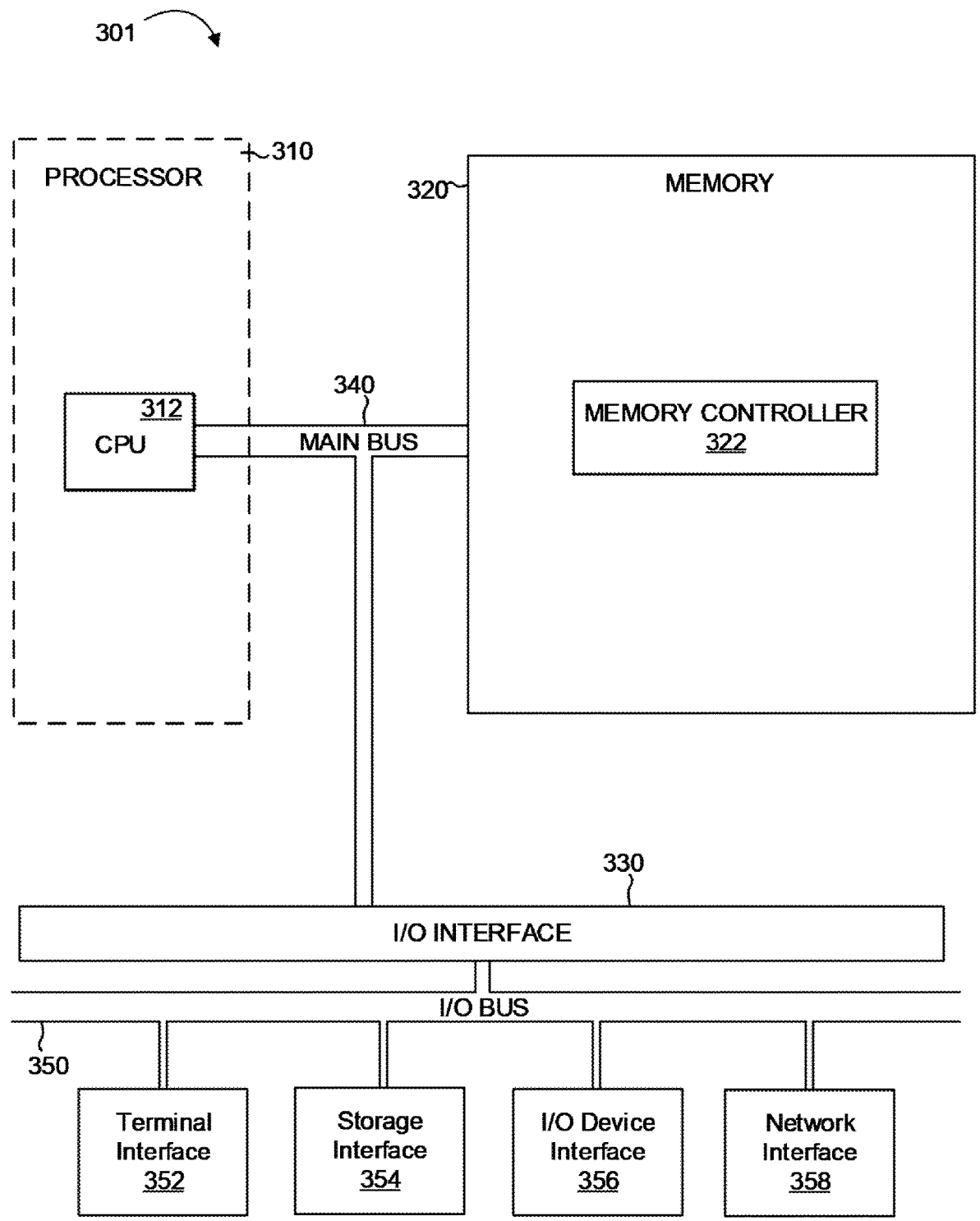
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or non-volatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301— including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
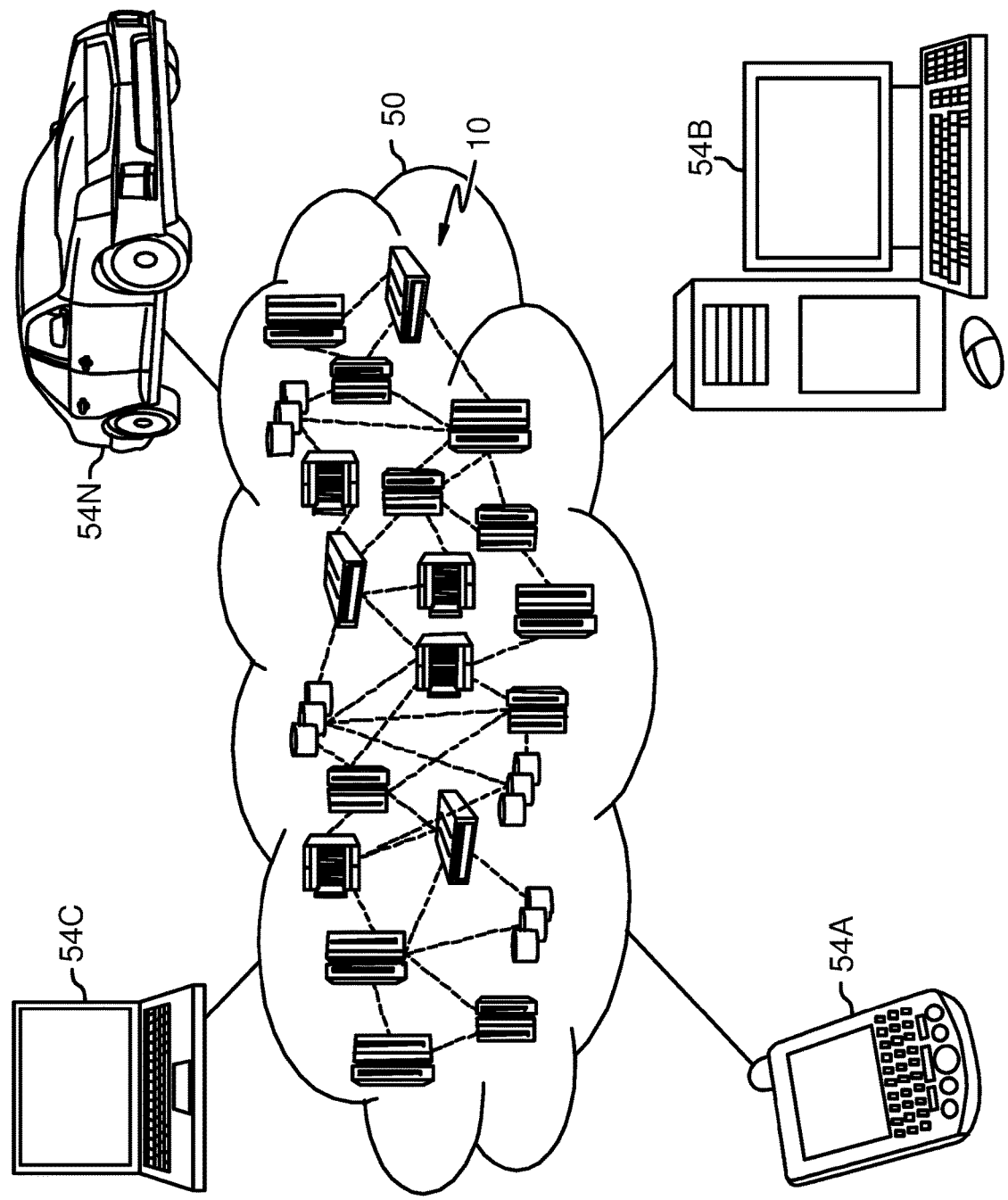
FIG. 4 depicts a cloud computing environment according to embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
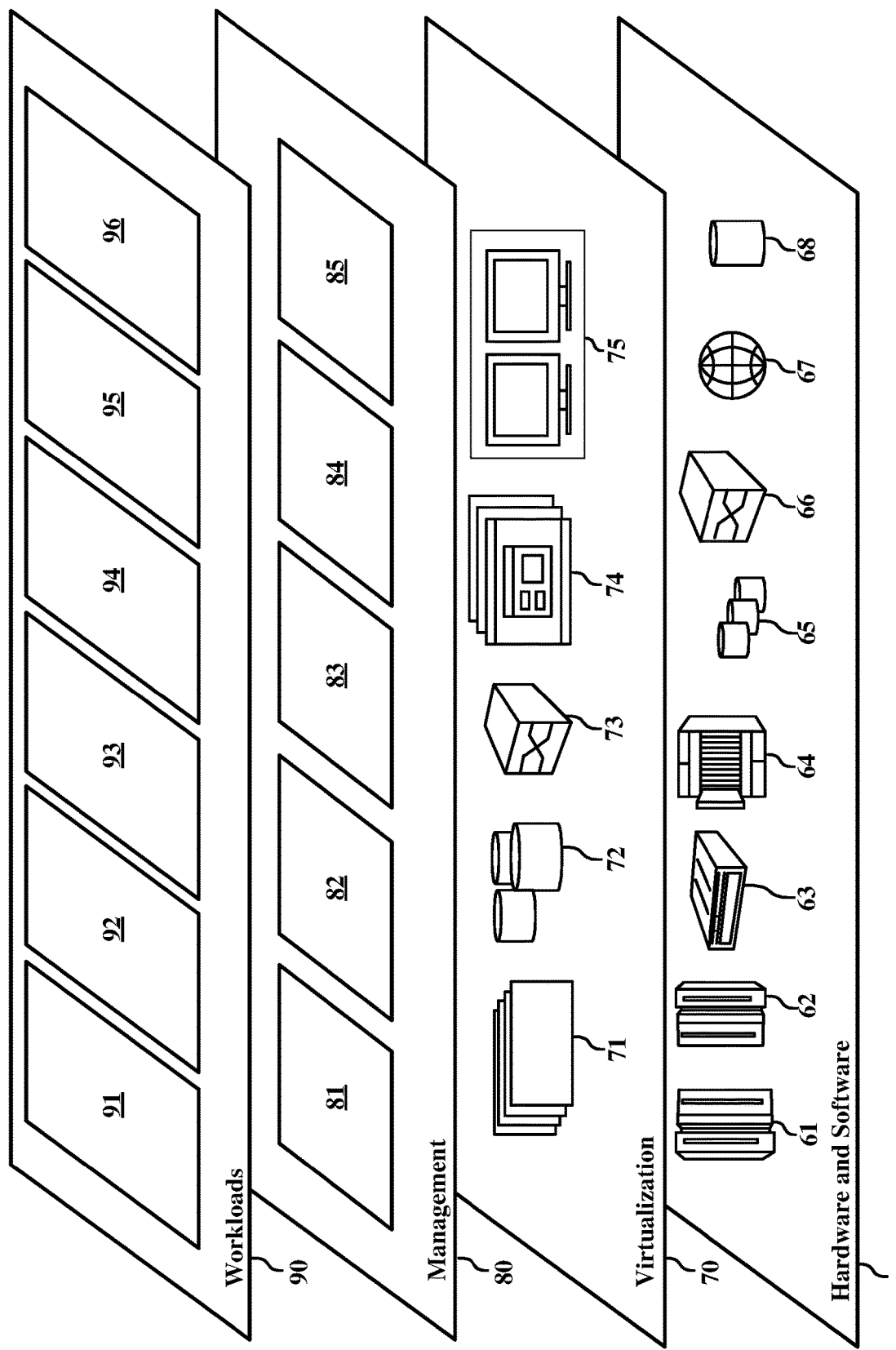
FIG. 5 depicts abstraction model layers according to embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and link analysis logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining target data corresponding to a link;
    determining, based on the target data, that the link is valid;
    obtaining, in response to the determining that the link is valid, source data corresponding to the link;
    determining, by comparing the target data to the source data, a degree of relevance between the target data and the source data;
    determining, based on the degree of relevance, that the link is incorrect;
    identifying a resource that is consistent with the source data corresponding to the link;
    generating a corresponding notification indicating that the link is incorrect and that the resource has been identified as being consistent with the source data corresponding to the link; and
    initiating a transfer of the notification to a user device.

2. The computer-implemented method of claim 1, further comprising:
    obtaining a web page inventory, the web page inventory comprising stored target data of a plurality of web pages, the stored target data including first stored target data of a first web page;
    identifying, by comparing the stored target data to the source data, a match between the first stored target data and the source data; and
    initiating, in response to the identifying the match, a display of the first stored target data on the user device.

3. The computer-implemented method of claim 2, wherein the identifying the match comprises determining that a degree of relevance between the stored target data and the source data exceeds a predetermined threshold.

4. The computer-implemented method of claim 1, wherein the target data comprises a Uniform Resource Locator (URL) of a target web page and content of the target web page, and
    wherein the content of the target web page is selected from the group consisting of a title, a meta tag, an abstract, and text of the target web page.

5. The computer-implemented method of claim 4, wherein the source data comprises a HyperText Markup Language (HTML) code label and text proximate to the HTML code label.

6. The computer-implemented method of claim 5, further comprising:
    applying natural language processing to the source data to generate first contextual data;
    applying natural language processing to the target data to generate second contextual data; and
    wherein the comparing the target data to the source data comprises comparing the first contextual data to the second contextual data.

7. The computer-implemented method of claim 6, further comprising:
    obtaining feedback data, the feedback data comprising input from a user regarding a first accuracy of the first contextual data and a second accuracy of the second contextual data.

8. A system comprising:
    one or more processors; and
    one or more computer-readable storage media storing program instructions which, when executed by the one or more processors, are configured to cause the one or more processors to perform a method comprising:
    obtaining target data corresponding to a link;
    determining, based on the target data, that the link is valid;
    obtaining, in response to the determining that the link is valid, source data corresponding to the link;
    determining, by comparing the target data to the source data, a degree of relevance between the target data and the source data;
    determining, based on the degree of relevance, that the link is incorrect;
    identifying a resource that is consistent with the source data corresponding to the link;
    generating a corresponding notification indicating that the link is incorrect and that the resource has been identified as being consistent with the source data corresponding to the link; and
    initiating a transfer of the notification to a user device.

9. The system of claim 8, the method further comprising:
obtaining a web page inventory, the web page inventory comprising stored target data of a plurality of web pages, the stored target data including first stored target data of a first web page;
identifying, by comparing the stored target data to the source data, a match between the first stored target data and the source data; and
initiating, in response to the identifying the match, a display of the first stored target data on the user device.

10. The system of claim 9, wherein the identifying the match comprises determining that a degree of relevance between the stored target data and the source data exceeds a predetermined threshold.

11. The system of claim 8, wherein the target data comprises a Uniform Resource Locator (URL) of a target web page and content of the target web page, and
wherein the content of the target web page is selected from the group consisting of a title, a meta tag, an abstract, and text of the target web page.

12. The system of claim 11, wherein the source data comprises a HyperText Markup Language (HTML) code label and text proximate to the HTML code label.

13. The system of claim 12, the method further comprising:
applying natural language processing to the source data to generate first contextual data;
applying natural language processing to the target data to generate second contextual data; and
wherein the comparing the target data to the source data comprises comparing the first contextual data to the second contextual data.

14. The system of claim 13, the method further comprising:
obtaining feedback data, the feedback data comprising input from a user regarding a first accuracy of the first contextual data and a second accuracy of the second contextual data.

15. A computer program product comprising one or more computer readable storage media, and program instructions collectively stored on the one or more computer readable storage media, the program instructions comprising instructions configured to cause one or more processors to perform a method comprising:
obtaining target data corresponding to a link;
determining, based on the target data, that the link is valid;
obtaining, in response to the determining that the link is valid, source data corresponding to the link;
determining, by comparing the target data to the source data, a degree of relevance between the target data and the source data;
determining, based on the degree of relevance, that the link is incorrect;
identifying a resource that is consistent with the source data corresponding to the link;
generating indicating that the link is incorrect and that the resource has been identified as being consistent with the source data corresponding to the link a corresponding notification; and
initiating a transfer of the notification to a user device.

16. The computer program product of claim 15, the method further comprising:
obtaining a web page inventory, the web page inventory comprising stored target data of a plurality of web pages, the stored target data including first stored target data of a first web page;
identifying, by comparing the stored target data to the source data, a match between the first stored target data and the source data; and
initiating, in response to the identifying the match, a display of the first stored target data on the user device.

17. The computer program product of claim 16, wherein the identifying the match comprises determining that a degree of relevance between the stored target data and the source data exceeds a predetermined threshold.

18. The computer program product of claim 15, wherein the target data comprises a Uniform Resource Locator (URL) of a target web page and content of the target web page, and
wherein the content of the target web page is selected from the group consisting of a title, a meta tag, an abstract, and text of the target web page.

19. The computer program product of claim 18, wherein the source data comprises a HyperText Markup Language (HTML) code label and text proximate to the HTML code label.

20. The computer program product of claim 19, the method further comprising:
applying natural language processing to the source data to generate first contextual data;
applying natural language processing to the target data to generate second contextual data; and
wherein the comparing the target data to the source data comprises comparing the first contextual data to the second contextual data.

* * * * *